July 23, 1957　　　J. H. THORNBERY ET AL　　　2,800,614
ELECTROMAGNETIC CONTROL DEVICE
Filed May 8, 1952　　　　　　　　　　　　　3 Sheets-Sheet 3
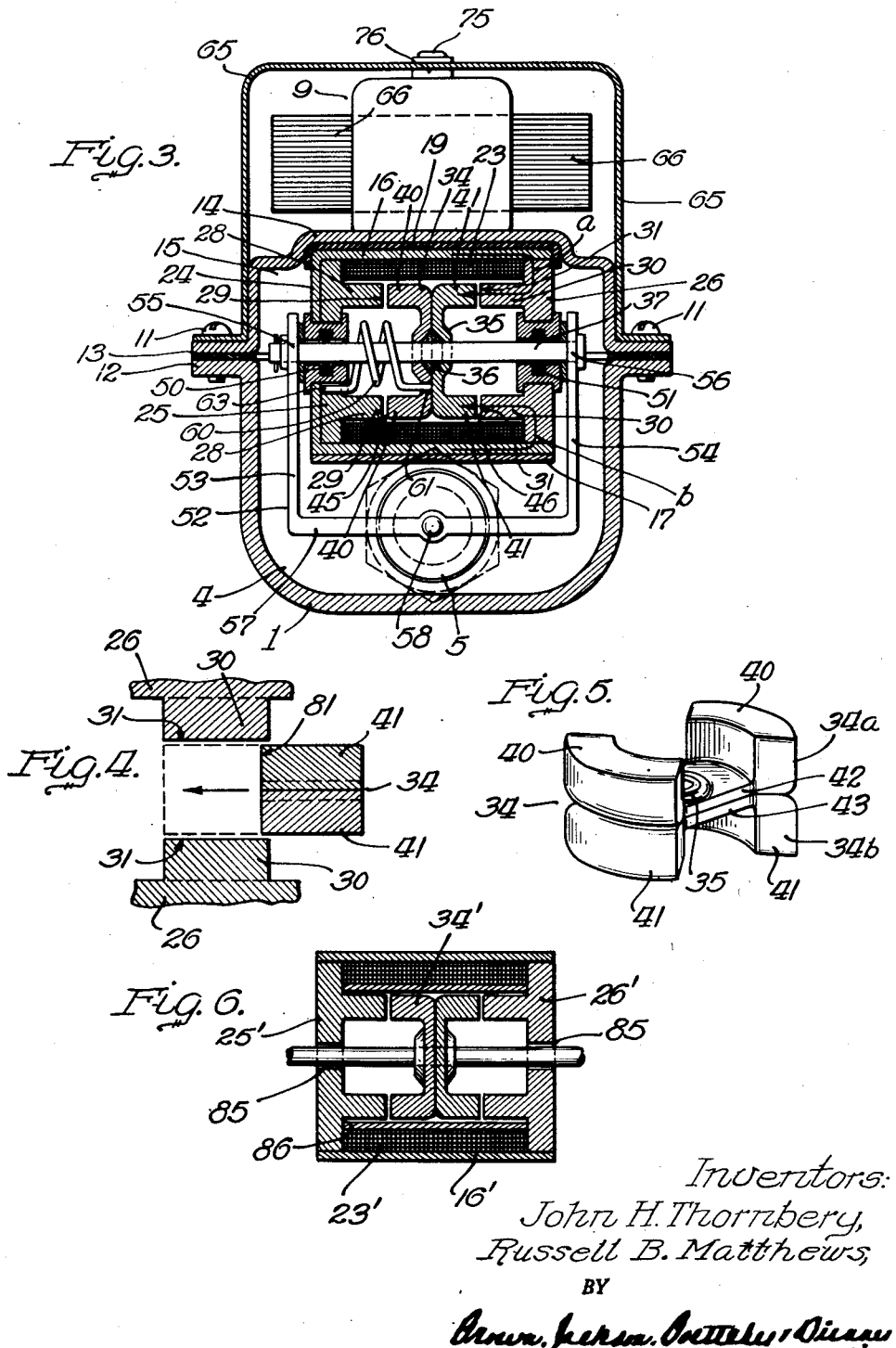
Inventors:
John H. Thornbery,
Russell B. Matthews,
BY
Attys.

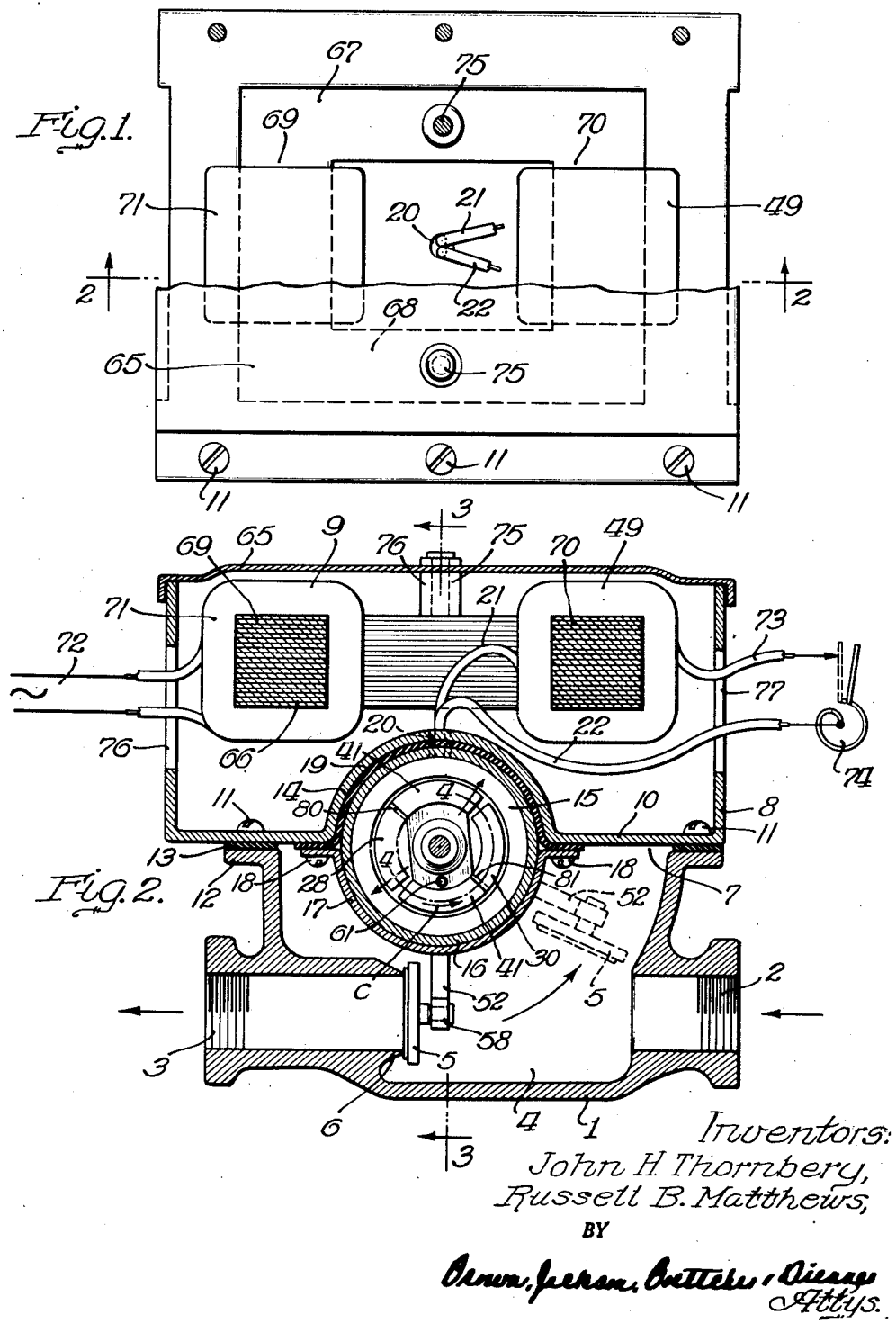

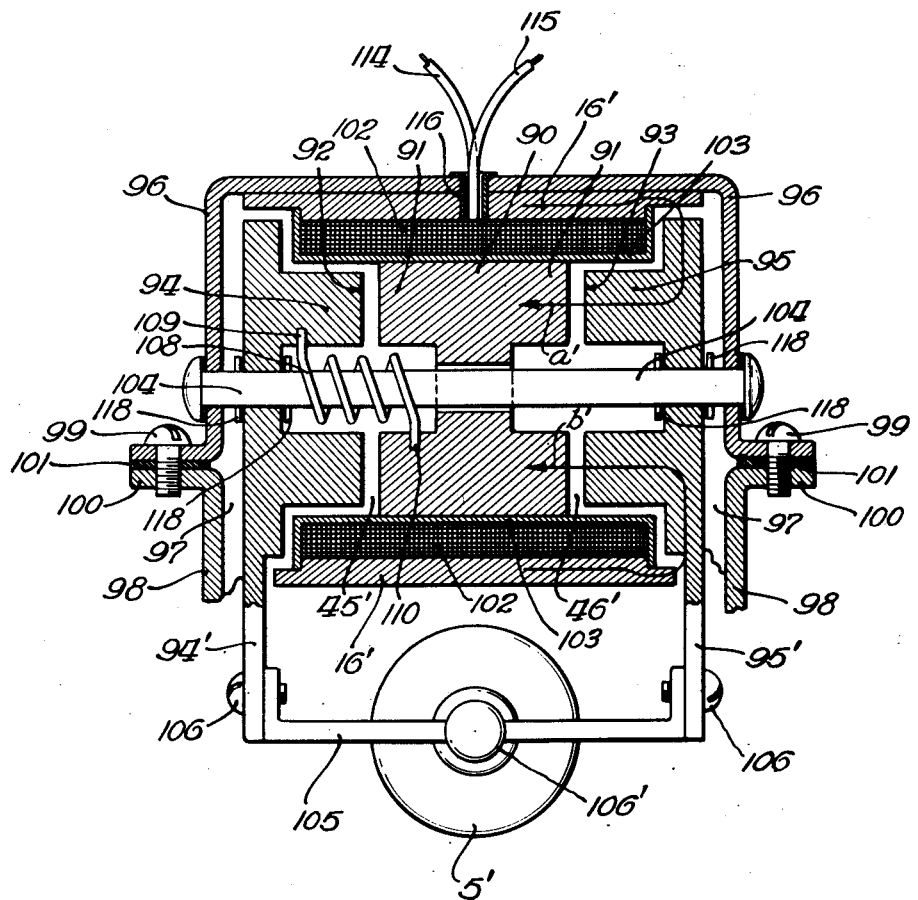

United States Patent Office 2,800,614
Patented July 23, 1957

2,800,614

ELECTROMAGNETIC CONTROL DEVICE

John H. Thornbery, Whitefish Bay, and Russell B. Matthews, Wauwatosa, Wis., assignors to Baso Inc., a corporation of Wisconsin Application May 8, 1952, Serial No. 286,736

6 Claims. (Cl. 317—197)

This invention relates, in general, to control devices, and more particularly, to an improved electromagnetic operator and an improved combination of electromagnetic operator and valve or similar actuated device of novel construction and coaction and having especial utility, for example, in controlling the flow of fluids and particularly the flow of gas for a gas heater.

While the electromagnetic operator is especially adapted for operating a valve and has novel coaction therewith, it is to be understood that it is not in some aspects limited to such use but may be employed for all similar purposes, for example, for operating a switch or other like or desired device.

One of the main objects of the present invention is to provide an improved form of electromagnetic device especially adapted to be utilized for control of smaller valves and wherein the device and particularly the valve and the rotary armature and the actuating connection therebetween may be reduced in mass and inertia and are of simple, compact and relatively inexpensive construction.

Another object is to provide a small, compact and highly efficient device that lends itself to economical fabrication, is silent in operation, has high torque at the start of the stroke and has no need for shading.

Another object is to provide a device that may be disposed with the axis of the armature in horizontal or any other desired position and a device which is immune to the influence of gravity and therefore may be used in any such position.

Another object is to provide a novel mounting for the electromagnetic operator and a novel actuating connection between the operator and the valve.

Another object is to provide a device of the character described wherein rotation or turning movement of the armature imparts swinging movement to the valve; and wherein the valve when open is well out of the fluid stream thereby providing unimpaired flow of the fluid.

Another object is to provide a device wherein the armature shaft may be brought out from the magnetic frame via "O" rings which act as a gas seal to keep the gas out of the operating mechanism and the coil or winding of the device.

Another object is to provide, where it is permissible to allow the gas to come in contact with the operating mechanism, a structure which will keep the coil of the device out of the gas stream.

Another object is to combine the electromagnetic operator with an integrally mounted transformer for applications where it is desired, for example, to provide low voltage for a thermostat or other condition responsive circuit.

Another object is to provide a magnetic armature formed of cup-shaped stampings thereby reducing cost, simplifying construction and reducing the mass and inertia of the armature.

Another object is to provide an improved form of device wherein loss of power generated by the magnetic field in axial thrust on the armature is eliminated.

Another object is to provide an improved form of device wherein the working air gap is divided into equal parts on opposite sides of the magnetic armature in the direction of the axis thereof whereby the inherent tendency of the electromagnet to reduce either air gap will be opposed by the inherent tendency opposing any increase in the other air gap for accomplishing the results set forth.

Another object is to provide an improved form of control device wherein the initial operating force which is obtained is at a maximum at the beginning of the operator movement, as distinguished from devices in which the force exerted initially is a minimum. This is advantageous in that it provides a large initial or starting force for overcoming the inertia and friction of moving parts and a strong initial force which, for example, will overcome fluid pressure, for example, in "cracking" or opening a valve wherein the controlled fluid, such as gas for a heater, usually tends to hold the valve closed.

Another object is to provide an improved form of device wherein the magnetic air gap is never completely closed and which air gap remains constant throughout the life of the device, as distinguished from electromagnetic devices wherein a magnetic part is attracted to and sealed against an electromagnet when energized or in which non-magnetic spacers are utilized in an attempt to maintain an air gap. The present device thereby eliminates any sticking or "hang up" of the attracted member, and substantially eliminates any differential in the "pick up" and "drop out" of the device as, for example, due to residual magnetism. The electromagnetic operator of the present invention therefore has great sensitivity and quick response.

Another object is to provide an improved form of device for translation of electrical energy to rotary mechanical movement, and more particularly to rotary movement controlled both in direction and magnitude and wherein a magnetic stop is provided to prevent rotation of greater degree than desired.

Another object is to provide a device of the character described which is quiet and efficient in operation and affords increased efficiency in the transformation from electrical to mechanical energy, for example, in providing for a given size unit substantially increased output as compared to known devices of similar character.

Further objects and advantages and numerous adaptations of the invention will appear from the following detailed description taken in connection with the accompanying drawings it being understood that the invention is limited only within the scope of the appended claims and not to the particular embodiments selected for illustration.

In the drawings:

Figure 1 is a top plan view of one form of device embodying the present invention with the cover of the transformer enclosure partially broken away;

Figure 2 is a sectional view taken on the line 2—2 of Figure 1;

Figure 3 is a sectional view taken on the line 3—3 of Figure 2;

Figure 4 is a fragmentary arcuate section taken on the line 4—4 of Figure 2;

Figure 5 is a perspective view of the magnetic rotor employed in the device shown in Figures 1–4;

Figure 6 is an axial sectional view through a magnetic operator according to the present invention and showing another form of means for keeping the coil of the device out of the gas stream; and Figure 7 is a sectional view similar to Figure 3 illustrating a modified form of device in which the parts which were the stator and rotor are now the rotor and stator, respectively, with resulting simplification of the device.

Referring first to Figures 1–5 of the drawings, the embodiment of the invention therein illustrated comprises a valve body 1 having a fluid inlet 2 and a fluid outlet 3 with a valve chamber 4 therebetween. A valve member 5 cooperates with a valve seat 6 at the outlet 3 to control the flow of fluid through the valve, for example, the flow of gaseous fuel to a burner (not shown) or any other fluid. It will be noted that the controlled fluid tends to hold the valve member 5 closed. This may, of course, vary within the scope of the present invention.

The valve body 1 has an opening 7 covered by an enclosure 8 for a transformer 9 to be hereinafter described, the bottom wall 10 of enclosure 8 affording a plate-like cover for opening 7 and being secured in place, for example, by screws 11 threaded into a flange 12 formed as an integral part of the valve body 1. Sealing means 13 is preferably interposed between the plate 10 and valve body 1 to render the connection gastight. The enclosure 8 is preferably a die casting of non-magnetic material such as aluminum. The portion of the plate 10 presented to the valve chamber 4 has a depression 14 which is contoured, for example, semicylindrically outwardly of the valve body.

An electromagnetic operator designated in general at 15 comprises a magnetic outer shell or frame 16 shown of cylindrical or annular form and as supported in the depression 14 by a bracket 17, for example, of complementary semicylindrical form. The bracket 17 is secured, for example, to the plate 10 with the shell 16 clamped between the semicylindrical portions of plate 10 and bracket 17 by screws 18 extending through flanges on the bracket and threaded into the plate 10. A gasket member 19 or other suitable sealing means is preferably interposed between shell 16 and plate 10 and acts to prevent gas from seeping out through hole 20 which is provided to bring out the leads 21 and 22 for the solenoid coil 23.

The shell 16 is shown of generally cup-shaped form closed at one end by an integral magnetic end wall 24 and open at its opposite end. A first magnetic frame member 25 (the shell also constitutes part of the magnetic frame as will presently appear) is mounted within the closed end of the shell 16 with its outer periphery and outer end in good magnetic contact with the shell 16. A second magnetic frame member 26 is mounted within the opposite end of the shell 16 in axially spaced relation with respect to the frame member 25 and with its outer periphery in good magnetic contact with the inner periphery of the shell 16. The magnetic shell 16 and magnetic frame members 25 and 26 with their pole pieces to be presently described are preferably non-laminated. The frame members 25 and 26 are preferably in the form of stampings, although they may be in the form of castings or of other suitable form.

The magnetic frame member 25 has a pair of arcuate pole pieces 28 formed, for example, as integral parts of frame member 25. These pole pieces project inwardly into shell 16 and have inwardly presented arcuate pole surfaces 29. The magnetic frame member 26 has a pair of similar arcuate pole pieces 30 formed, for example, as integral parts thereof. These pole pieces 30 project inwardly from the opposite end of the shell 16 and have inwardly presented arcuate surfaces 31 presented toward and adapted for register with the arcuate pole surfaces 29 and spaced therefrom in the direction of the axis of the electromagnetic operator.

A rotary armature or rotor 34 has its hub 35 fixed, for example, at 36 to a shaft 37 so that the shaft will turn with turning movement of the armature. In general, the rotor 34 comprises a pair of stampings 34a and 34b each having a pair of arcuately shaped arms 40 and 41, respectively, which are oppositely directed and are joined by connecting portions 42 and 43 which may be seam welded or otherwise suitably joined together. The hub 35 is formed at integral parts of the connecting portions 42 and 43. The rotor 34 is formed of magnetic material such as steel.

As shown in Figure 3, the arcuate arms 40 and 41 operate between the opposing arcuate surfaces 29 and 31 of the pole pieces 28 and 30. The arcuate surfaces at the ends of the arms 40 and 41 are spaced endwise and preferably equally from the surfaces 29 and 31 sufficient distances at 45 and 46 (Figure 3) to afford clearance for the arms 40 and 41 through 360° of rotation. The configuration of the pole pieces 28 and 30 and the related configuration of the arms 40 and 41 are best shown in Figure 2. The air gaps 45 and 46 are relatively small. They need be no greater than the clearance needed for turning movement of the arms 40 and 41 between the pole pieces 28 and 30.

The electromagnetic operator 15 further comprises the solenoid coil 23 which is adapted, for example, to be connected in series with the secondary winding 49 of the transformer 9 as will hereinafter appear. The coil 23 is shown of annular form and is disposed within the shell 16 around the rotor 34 and pole pieces 28 and 30 and endwise between the magnetic frame members 25 and 26. The shaft 37 which is connected to turn with the rotor 34 extends at opposite ends through axial openings in frame members 25 and 26 and is journaled for turning movement therein. In this particular embodiment of the invention, the opposite ends of rotor shaft 37 are brought out through frame members 25 and 26 via rubber-like O rings 50 and 51 which act as gas seals which keep the gas off of the operating mechanism and the coil or winding 23.

An actuating member or yoke 52 is shown, for example, in the form of a U-shaped stamping having arms 53 and 54 which straddle the ends of the magnetic frame and are connected at 55 and 56 to the projecting ends of the shaft 37 for swinging movement of the member 52 around the magnetic frame with turning movement of the shaft 37. The intermediate portion 57 of the member 52 which connects the arms 53 and 54 and extends substantially parallel with the axis of the shaft 37 carries and supports the valve disc 5 which is connected thereto at 58.

A torsion spring 60 is shown coiled about the shaft 37 between the frame member 25 and the rotor 34 and has one end fixed at 61 to the connecting portion 42 of the rotor. The opposite end of the spring 60 is fixed, for example, at 63 to the frame member 25. In the illustrated embodiment of the invention, the spring 60 serves to bias the valve disc 5 to closed position against its valve seat 6 and provides the necessary sealing force against the valve seat. At the same time the spring 60 acts to bias the rotor 34 to the position it assumes when the coil 23 is deenergized as will presently appear.

For applications where it is desired, for example, to provide low voltage, for example, for a thermostat circuit, the transformer 9 may be enclosed within the enclosure 8 which is shown as provided with a removable and replaceable cover 65 secured in place, for example, by the screws 11 threaded into the flange 12 on the valve body 1. The transformer 9 has a core 66 of laminated or other suitable form. The particular core selected for illustration is of generally rectangular configuration comprising a pair of parallel side legs 67 and 68 magnetically connected by parallel end legs 69 and 70. A primary winding 71 surrounds the end leg 69 and is adapted to be connected to a suitable source of electric energy, for example, to a 115 volt alternating current power circuit 72.

The secondary winding 49 surrounds the end leg 70 and its circuit may include condition responsive means such as a thermostat illustrated schematically at 74 in Figure 2. The coil or winding 23 of the electromagnetic operator 15 is connected in series with the secondary winding 49 by leads 21 and 22 and a lead 73 which leads from the winding 49 and constitutes the other conductor of the secondary circuit.

The transformer 9 is shown as assembled and fastened to the inner side of the cover 65, for example, by fastening the core 66 to the inner side of the cover 65, for example, by fastening posts 75 with suitable spacers 76 between the cover 65 and the core 66. When the cover 65 is removed and replaced, the transformer 9 is removable and replaceable as a unit therewith. The cover 65 is preferably formed of non-magnetic material such as aluminum and may be a die casting, stamping or the like.

One of the advantages of an integral structure of the aforementioned type is that the transformer 9 may be of the non-current limiting type because an accidental short circuiting of leads 22 and 73 will not short circuit the seconday winding 49. With the transformer 9 mounted on the cover 65, it may be removed from enclosure 8, for example, while the conduit is being inserted and the lead connections made by the simple expedient of removing the cover. This eliminates the necessity for large clearance at both ends of the transformer and greatly reduces the length of the device. Moreover, with the arrangement shown, the windings 71 and 49 of the transformer are nested down along the sides of the semi-cylindrical portion 14 of the plate 10 which makes for compactness. The enclosure 8 is shown provided with an opening 76 for entry of the leads of the power circuit 72 to the coil 71 and with another opening 77 for bringing out the lead 73 from the secondary coil 49 and the lead 22 from the winding 23 in series with coil 49.

The operation of the illustrated embodiment of the invention is as follows:

The rotor 34 is angularly disposed so that in unenergized condition the leading edges 80 and 81 (Figures 2 and 4) of the armature arms 40 and 41 are barely within the air gaps between the opposing arcuate surfaces 29 and 31 of the pole pieces 28 and 30; that is, a very small portion of the rotor 34 is presented to the pole pieces 28 and 30 respectively. The valve member 5 may be in closed position at this time as shown but it is to be understood that the valve may, of course, be normally open and operated to closed position by the electromagnetic operator. It is to be further understood that, as previously set forth, the electromagnetic operator may be used to operate an electric switch or any other similar or desired device.

It is, of course, understood that the angular position of the shaft 37 and hence rotor 34 and the position of the valve member 5 when the electromagnetic operator 15 is unenergized is determined, for example, by the bias of the spring 60. In the illustrated embodiment of the invention, the sealing of valve member 5 against the valve seat 6 under the spring bias limits the rotation or turning movement of the rotor 34 and provides a stop therefor in its unenergized state.

When the circuit of the coil or winding 49 is closed as, for example, by closure of the contacts of the thermostat 74, the induced current in the secondary winding 49 will flow through the winding 23 and generate magnetic flux in the magnetic frame which flux will flow through the magnetic frame in the direction indicated by the arrows $a$ and $b$ in Figure 3. This magnetic flux flows through the pole pieces 30 across the air gaps 46 to link magnetic rotor 34; through the rotor 34; across air gaps 45; through the pole pieces 28; and thence through the outer magnetic shell 16 to complete the magnetic circuit.

Since the magnetic flux will cross the air gaps between the pole pieces 30 and 28 at the point of minimum air gap and since the minimum air gap occurs at the points where the leading edges 80 and 81 (Figures 2 and 4) are presented to the pole pieces 30 and 28, the magnetic flux will be concentrated at these points imparting a counter-clockwise torque to turn the rotor 34 in the direction indicated by the arrow $c$ in Figure 2. Hence the rotor 34 will be rotated into the air gap until the arcuate surfaces of the rotor arms 40 and 41 are in registry with the pole faces 29 and 31 of the pole pieces 28 and 30 respectively as shown in dotted lines in Figure 4. Further rotation of the rotor will not occur since such movement would tend to increase the air gap and movement of the leading edges 80 and 81 beyond the pole faces of the pole pieces 28 and 30 would set up magnetic forces creating a torque in the opposite direction. The rotor 34 is thereby afforded a magnetic stop limiting its rotation in counterclockwise direction as viewed in Figure 2 to a position wherein the arms 40 and 41 are in registry with the pole faces of the pole pieces 28 and 30.

The foregoing phenomenon may be further elucidated by reference to the mathematical relationship involved which may be expressed as follows:

$$F = \frac{B^2 A}{72} \text{ lbs.}$$

where F is the force of attraction brought to bear upon the rotor 34 expressed in pounds, B is the magnetic flux density and A is the area of rotor 34 presented to the pole pieces 28 and 30. From this relationship, it will also be seen that the device described inherently imparts a greater force at the beginning of the stroke than at the end thereof, since A (the area of the rotor presented to the pole pieces) increases as the rotor approaches registry with the pole pieces and F varies inversely with A. For example, if the rotor area presented to the pole pieces is .0508 square inch when the rotor is unenergized and the total area of the rotor arms which may be presented to the pole pieces when in registry therewith is .71 square inch, the force at the beginning of the stroke will be 13.95 times the force exerted at the end of the stroke. This relationship has obvious advantages in that the rotor torque varies in the same manner as the forces required to operate a mechanism requiring greater force to initiate movement thereof than to maintain such movement, as for example, a valve member such as valve member 5 which must be moved against fluid pressure initially.

As best shown in Figure 3, the opposing pole faces of the pole pieces 28 and 30 are according to the present invention spaced in a direction parallel with the axis of the shaft 37 and are disposed on opposite sides of the rotor arms 40 and 41, that is, with the pole piece 28 to the left of the rotor arms and pole piece 30 to the right of the rotor arms as the device is illustrated in Figure 3. This is highly advantageous in that it eliminates loss of power generated by the magnetic field in axial thrust on the rotor or bearings therefor. By dividing the working gap into equal parts on opposite sides of the magnetic rotor in the direction of the axis thereof, the inherent tendency of the electromagnet to reduce either air gap 45 or 46 will be opposed by the inherent tendency opposing any increase of the other air gap. Hence the magnetic forces tending to close the air gaps 45 and 46 oppose each other and frictional loss due to bearing thrust is eliminated. This is an important aspect of the invention in combination with the other advantageous aspects shown and described.

When the valve member 5 is in closed position against the seat 6, the spring 60 is torsioned but the spring force at this time may be relatively small, i. e., just sufficient to overcome or equal gravity and to provide the desired valve sealing force. Movement of the rotor 34 in valve opening direction further torsions the spring 60 which upon deenergization of the electromagnet returns the valve member to closed position. It will now be apparent that as previously set forth the device is exceedingly compact and the valve, rotary armature and actuating connection therebetween are of small mass and low inertia so that only relatively small force is needed to operate the device. The device is especially adapted for use with the axis of the rotor disposed horizontally, but since gravity need not be a factor the device may be used in any position. When the valve 5 is in open position as shown in dotted lines in Figure 2, it is well up and out of the gas stream thereby providing unimpaired flow of the gas.

The device also lends itself to ease of assembly which may be accomplished by inserting the rotor and rotor shaft and solenoid coil into the metal shell 16 in the illustrated relation with respect to the pole piece 28. Pole piece 30 may then be inserted into the opposite end of the shell 16 and, for example, seam welded to shell 16 to provide a gastight joint. The operator is then assembled to top plate 10 by means of bracket 17.

In the above described embodiment of the invention, the O rings 50 and 51 with the closed end of the shell 16 and the welding of the pole piece 30 to the shell act to keep the gas out of the operating mechanism and away from the solenoid coil.

Where it is sufficient to keep the gas off of the solenoid coil only and is permissible to allow the gas to come in contact with the operating mechanism, a structure such as the one shown in Figure 6 may be followed. In this form of device the O rings 50 and 51 of the preceding embodiment of the invention have been replaced with metal-to-metal bearings shown at 85 and no attempt is made to seal the gas from the operating mechanism. To keep the coil or winding 23' out of the gas stream, a non-magnetic stainless steel tube 86 is disposed within and covers the inner periphery of the coil 23'. The ends of the tube 86 are soldered, welded or otherwise suitably fastened to the frame members 25' and 26' in a manner to provide tight seals and thereby to keep the coil 23' out of the gas stream. The rotor is indicated at 34' and in this case the outside shell 16' instead of being of cup-shaped form is in the form of a magnetic tube, the ends of which may be welded or otherwise joined to the peripheries of the frame members 25' and 26'.

In the embodiment of the invention illustrated in Figure 7, the magnetic frame comprises a magnetic outer shell or frame 16' which may be of cylindrical or annular form as in the preceding embodiment of the invention and a fixed magnetic member 90 disposed within the shell 16' intermediate the ends thereof. The magnetic member 90 has arcuate arms 91 which project from opposite ends thereof and operate between opposing arcuate surfaces 92 and 93 of pole piece members 94 and 95 which together constitute the rotary armature or rotor. The construction of the arcuate arms 91 and pole piece members 94 and 95 and their functional coaction may be in general the same as described in connection with the preceding embodiment of the invention except that what were the stationary magnetic members at the ends of the shell 16' in the preceding embodiment of the invention now constitute the rotor and whereas what was previously the rotor operating between such stationary magnetic members is now a fixed magnetic member or stator disposed between the armature parts.

The outer shell 16' is suitably fastened to and supported by a cover 96 which may, for example, be a valve body cover for an opening 97 in a valve body 98 corresponding to the valve body 1 of the preceding embodiment of the invention. The cover 96 may be secured in place, for example, by screws 99 threaded into a flange 100 formed as an integral part of the valve body 98. Sealing means 101 is preferably interposed between the flange of the cover 96 and valve body 98 to render the connection gastight. The cover or enclosure 96 is preferably a die casting of non-magnetic material such as aluminum.

The solenoid coil 102 is of annular form and is disposed within the shell 16' and around the magnetic member 90 and the arcuately shaped arms of the rotor members or pole pieces 94 and 95. The outer shell 16', coil or winding 102 and magnetic stator member 90 are joined together in one unit as shown. If desired, a non-magnetic stainless steel bobbin or sleeve 103 may be disposed within and cover the inner periphery of the coil 102. The ends of the sleeve 103 are turned out over the ends of the coil 102 and soldered, brazed, welded or otherwise suitably fastened to the outer shell 16' in a manner to provide tight seals and thereby keep the coil 102 out of the gas stream.

The shaft 104 extends axially through the magnetic stator member 90 and axially through the magnetic rotor members 94 and 95. The opposite ends of the shaft 104 project through openings in the sides of the cover 96 and are rigidly fastened therein so that the shaft will be stationary and have gastight connection at opposite ends to the cover. The magnetic rotor members 94 and 95 have turning movement or rotation as a unit about the shaft 104. The members 94 and 95 have integral projecting arms 94' and 95' which are joined by a cross piece 105 secured, for example, at its opposite ends to the arms 94' and 95' by screws 106. This provides a simplified form of bridge or yoke which has swinging movement around the outside of the magnetic frame with turning movement of the armature or rotor comprising the rotor parts 94 and 95. The cross piece 105 supports the valve disc 5' which is connected thereto at 106' for swinging movement with turning movement of the rotor parts 94 and 95.

The valve disc 5' cooperates wtih a valve seat (not shown) at the outlet (not shown) which opens from the interior of the valve body 98, for example, as in the preceding embodiment of the invention. A torsion spring 108 is shown coiled about the shaft 104 and has one end fixed at 109 to the rotor part 94. The opposite end of the spring 108 is fixed, for example, at 110 to the magnetic stator member 90. The spring 108 preferably biases the valve disc 5' to closed position against its valve seat and as in the preceding embodiment of the invention provides the necessary sealing force against the valve seat. At the same time, the spring 108 acts as before to bias the rotor (i. e., rotor parts 94 and 95) to the position assumed by the rotor when the coil 102 is deenergized.

The lead conductors 114 and 115 for the coil 102 are brought out through a grommet 116 in registering openings in the shell 16' and cover 96 for connection into the desired circuit in the manner shown and described in connection with the preceding embodiment of the invention or otherwise as suitable or desired.

When in the operation of the device shown in Figure 7 the coil 102 is energized from a suitable source of electric energy, magnetic flux is induced in the magnetic frame and this flux flows through the magnetic frame, for example, in the direction indicated by the arrows a' and b' in Figure 7. Rotation is imparted to the rotor in the manner described in connection with the preceding embodiment of the invention; also as previously described, the magnetic forces tending to close the air gaps 45' and 46' oppose each other so as to eliminate frictional loss due to bearing thrust or axial thrust on the rotor.

In the embodiment of the invention illustrated in Figure 7, the connecting portions between the arcuate arms of the rotor parts 94 and 95 are positioned between stops or abutments 118 on the shaft 104.

The embodiments of the invention shown in the drawings are for illustrative purposes only and it is to be expressly understood that said drawings and the accompanying specification are not to be construed as a definition of the limits or scope of the invention, reference being had to the appended claims for that purpose.

We claim:

1. An electromagnetic operator comprising, in combination, a fixed magnetically permeable frame, a shaft extending through said frame, said frame having pole pieces provided with oppositely directed pole surfaces disposed generally at right angles to the axis of said shaft, armature means coacting with said frame and mounted to turn about the axis of said shaft, said armature means having oppositely directed surfaces disposed generally at right angles to the axis of the shaft, one of said armature surfaces being presented to and spaced axially from one of said pole surfaces and an oppositely directed armature surface being presented to and spaced axially from an oppositely directed pole surface, means positioning, in the deenergized condition of said operator, said armature means with leading edges of said armature surfaces barely in registry with the pole surfaces to which they are presented, and means for producing magnetic flux in said frame for concentration at the point of registry of said leading edges with said pole surfaces to impart a torque to turn said armature means until the surfaces of said armature means are in substantial registry with said pole surfaces, further rotation of said armature means being prevented by an increase in the air gap which would result thereby affording a magnetic stop limiting rotation of said armature means to a position of substantial registry of said armature surfaces with said pole surfaces.

2. An electromagnetic operator comprising, in combination, a fixed magnetically permeable frame, a shaft extending through said frame, said frame having pole pieces provided with oppositely directed pole surfaces disposed generally at right angles to the axis of said shaft, armature means coacting with said frame and mounted to turn about the axis of said shaft, a control member connected to and movable with turning movement of said armature between a first position and a second position, said armature means having oppositely directed surfaces disposed generally at right angles to the axis of the shaft, one of said armature surfaces being presented to one of said pole surfaces and an oppositely directed armature surface being presented to an oppositely directed pole surface, means coacting with said control member to define said first position thereof, means biasing, in the deenergized condition of said operator, said control member to its said first position, the connection between said control member and said armature means positioning said armature means, when said control member is in its said first position, with the leading edges of said armature surfaces barely in registry with the pole surfaces to which they are presented, and means for producing magnetic flux in said frame for concentration at the point of registry of said leading edges with said pole surfaces to impart a torque to turn said armature means in opposition to said biasing means until the surfaces of said armature means are in substantial registry with said pole surfaces whereby said control member is moved to its said second position.

3. An electromagnetic operator comprising, in combination, a fixed magnetically permeable frame, a shaft extending through said frame, said frame having pole pieces provided with oppositely directed pole surfaces disposed generally at right angles to the axis of said shaft, armature means coacting with said frame and mounted to turn about the axis of said shaft, said armature means having oppositely directed surfaces disposed generally at right angles to the axis of the shaft, one of said armature surfaces being presented to one of said pole surfaces and an oppositely directed armature surface being presented to an oppositely directed pole surface, means positioning, in the deenergized condition of said operator, said armature means with the leading edges of said armature surfaces barely in registry with the pole surfaces to which they are presented, and an energizing coil coaxially surrounding said pole pieces and armature means for producing magnetic flux in said frame for concentration at the point of registry of said leading edges with said pole surfaces to impart a torque to turn said armature means until the surfaces of said armature means are in substantial registry with said pole surfaces.

4. An electromagnetic operator comprising, in combination, a fixed magnetically permeable frame, a shaft extending through said frame, said frame having pole pieces provided with oppositely directed pole surfaces disposed generally at right angles to the axis of said shaft, armature means coacting with said frame and mounted to turn about the axis of said shaft, said armature means having oppositely directed surfaces disposed generally at right angles to the axis of the shaft, one of said armature surfaces being presented to one of said pole surfaces and an oppositely directed armature surface being presented to an oppositely directed pole surface, means positioning, in the deenergized condition of said operator, said armature means with the leading edges of said armature surfaces barely in registry with the pole surfaces to which they are presented, and a transformer having a primary winding circuit and having a secondary winding circuit in which current is induced by energization of said primary winding circuit, said secondary winding circuit comprising a coil for effecting magnetic flux flow in said frame concentrated at the point of registry of said leading edges with said pole surfaces to impart a torque to turn said armature means until the surfaces of said armature means are in substantial registry with said pole surfaces.

5. An electromagnetic operator comprising, in combination, a fixed magnetically permeable frame, including a tubular magnetically permeable shell and magnetically permeable pole pieces mounted within opposite ends of said shell, said pole pieces being provided with inwardly directed pole surfaces spaced axially and disposed generally at right angles to the axis of said shell, a shaft extending generally coaxially through said shell, an armature fixed on said shaft in the space between said pole faces, said armature having oppositely directed surfaces disposed generally at right angles to the axis of the shaft, one of said armature surfaces being presented to one of said pole surfaces and an oppositely directed armature surface being presented to an opposite pole surface, means positioning, in the deenergized condition of said operator, said armature with the leading edges of said armature surfaces barely in registry with the pole surfaces to which they are presented, and an energizing coil within said shell coaxially surrounding portions of said pole pieces and said armature for producing magnetic flux in said frame concentrated at the point of registry of said leading edges with said pole surfaces to impart a torque to turn said armature until the surfaces of said armature are in substantial registry with said pole surfaces.

6. An electromagnetic operator comprising, in combination, a fixed magnetically permeable tubular shell, a magnetically permeable frame supported within said shell and spaced therefrom, said frame having axially outwardly directed pole pieces provided with pole faces disposed generally at right angles to the axis of said shell, a shaft extending through said frame and generally axially of said shell, an armature comprising armature parts disposed at opposite ends of said frame and having turning movement about said shaft, said armature parts having inwardly directed surfaces disposed generally at right angles to the axis of said shaft, a surface of one of said armature parts being presented to one of said pole surfaces and a surface of the other armature part being presented to an oppositely directed pole surface, means positioning, in the deenergized condition of said operator, said armature parts with the leading edges of said armature surfaces barely in registry with the pole surfaces to which they are presented, and an energizing coil coaxially surrounding said pole pieces and armature parts for producing magnetic flux in said frame concentrated at the point of registry of said leading edges with said pole surfaces to impart a torque to turn said armature until the surfaces of said armature are in substantial registry with said pole surfaces.

(References on following page)

References Cited in the file of this patent

UNITED STATES PATENTS

| | | |
|---|---|---|
| 868,230 | Thullen | Oct. 15, 1907 |
| 1,647,036 | Dileo | Oct. 25, 1927 |
| 1,672,193 | Bason | June 5, 1928 |
| 1,979,127 | Warrick | Oct. 13, 1934 |
| 2,130,871 | Boehne | Sept. 20, 1938 |
| 2,216,620 | List | Oct. 1, 1940 |
| 2,274,775 | Cox | Mar. 3, 1942 |
| 2,508,379 | Freedman | May 23, 1950 |

FOREIGN PATENTS

| | | |
|---|---|---|
| 259,719 | Great Britain | Oct. 21, 1926 |